United States Patent [19]

Komatsu et al.

[11] Patent Number: 5,797,112

[45] Date of Patent: *Aug. 18, 1998

[54] NAVIGATION APPARATUS USING A POSITION INDEX AND INFORMATION REPRESENTATIVE OF ROADS AND INSTITUTIONS

[75] Inventors: Takako Komatsu; Kazunori Muraki. both of Tokyo, Japan

[73] Assignee: NEC Corporation. Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 531,444

[22] Filed: Sep. 21, 1995

[30] Foreign Application Priority Data

Sep. 21, 1994 [JP] Japan ................................. 6-226410

[51] Int. Cl.$^6$ .............................. G01C 21/00; G01L 3/00
[52] U.S. Cl. ............................. 701/201; 395/12; 701/208
[58] Field of Search .......................... 364/443, 444.1, 364/444.2, 449.1, 449.2, 449.3; 395/2.4, 2.6, 2.66, 2.84, 12; 701/200, 201, 202, 207, 208, 209, 211

[56] References Cited

U.S. PATENT DOCUMENTS

| | | | |
|---|---|---|---|
| 5,041,983 | 8/1991 | Nakahara et al. | 364/449.3 |
| 5,177,685 | 1/1993 | Davis et al. | 364/443 |
| 5,191,532 | 3/1993 | Moroto et al. | 364/444.1 |
| 5,214,707 | 5/1993 | Fujimoto et al. | 395/2.84 |
| 5,272,638 | 12/1993 | Martin et al. | 364/444.2 |
| 5,274,560 | 12/1993 | LaRue | 364/444.2 |
| 5,524,169 | 6/1996 | Cohen et al. | 395/2.4 |
| 5,544,061 | 8/1996 | Morimoto et al. | 364/444.2 |

FOREIGN PATENT DOCUMENTS

| | | |
|---|---|---|
| 0 346 483 | 12/1989 | European Pat. Off. |
| 59-105113 | 6/1984 | Japan . |
| 61-118834 | 6/1986 | Japan . |
| 62-108111 | 5/1987 | Japan . |
| 63-163210 | 7/1988 | Japan . |
| 2-176868 | 7/1990 | Japan . |
| 3-039106 | 4/1991 | Japan . |
| 3-257485 | 11/1991 | Japan . |
| 3-282802 | 12/1991 | Japan . |
| WO 92/009866 | 11/1992 | WIPO . |

*Primary Examiner*—Michael Zanelli
*Assistant Examiner*—Edward Pipala
*Attorney, Agent, or Firm*—Foley & Lardner

[57] ABSTRACT

A moving object navigation apparatus includes an input section, a map information memory section, a database, a coordinate retrieval section, a route calculation section, and an output section. The input section inputs institution names indicating the present location of a moving object and a destination by using a natural language. The map information memory section stores a map including information of roads and institutions. The database stores the relationship between the institution names on the map stored in the memory and position indexes. The coordinate retrieval section retrieves the institution names indicating the present location and the destination, which are input by the input section, from the database, and outputs corresponding position indexes. The route calculation section obtains the shortest route between the position indexes of the present location and the destination, which are output from the coordinate retrieval section, by referring to the map stored in the memory. The output section outputs route information obtained by the calculation section to the user of the moving object.

7 Claims, 5 Drawing Sheets

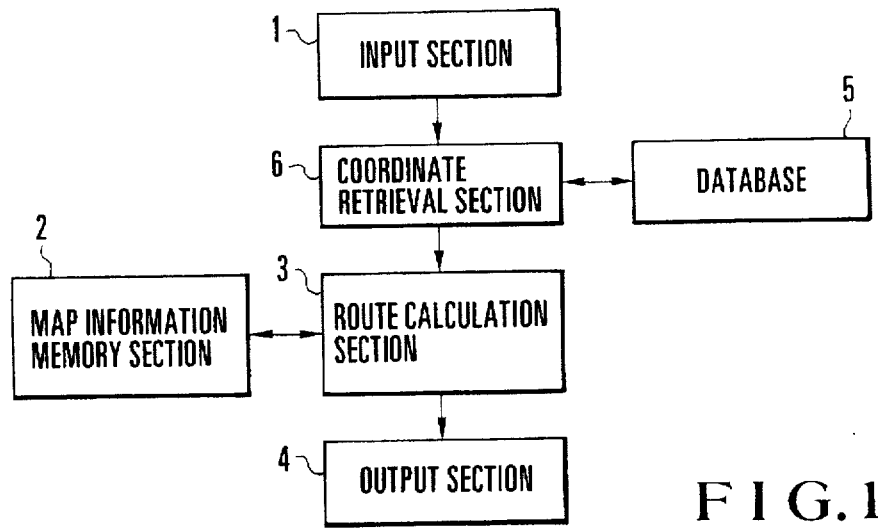
FIG. 1
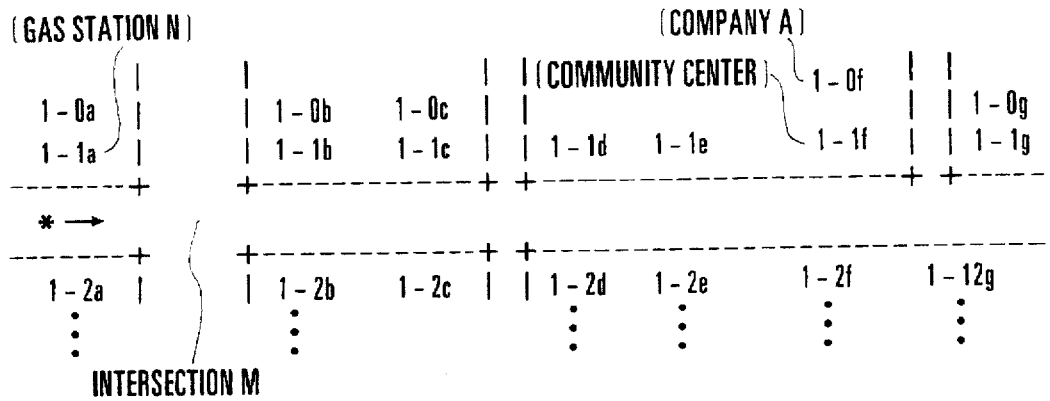
FIG. 2
| | POSITION INDEX |
|---|---|
| GAS STATION N | 1 - 1a |
| COMMUNITY CENTER | 1 - 1f |
FIG. 3

FIG.6

| | POSITION INDEX | GUIDE | ATTACHED INSTITUTION | OUTER APPEARANCE | CONSTRUCTION YEAR | NUMBER OF FLOORS |
|---|---|---|---|---|---|---|
| COMMUNITY CENTER | 1 – 1f | INTERSECTION M | LIBRARY | BROWN STAIRS | 1970 | 6 |
| LIBRARY | 1 – 1f | | COMMUNITY CENTER | | | |
| COMPANY A | 1 – 0f | | | IVORY | 1994 | 1 |

FIG.7

| EXPRESSION | DATA TYPE WHICH CAN BE INFERRED : VALUE |
|---|---|
| WHITE | OUTER APPEARANCE FEATURE:WHITE CONSTRUCTION YEAR:1992 OR LATER |
| NEW | CONSTRUCTION YEAR : 1992 OR LATER + REMARKS : RECONSTRUCTION |
| SHORT | NUMBER OF FLOORS : 3 OR LESS |
| OLD | CONSTRUCTION YEAR : 1980 OR BEFORE |

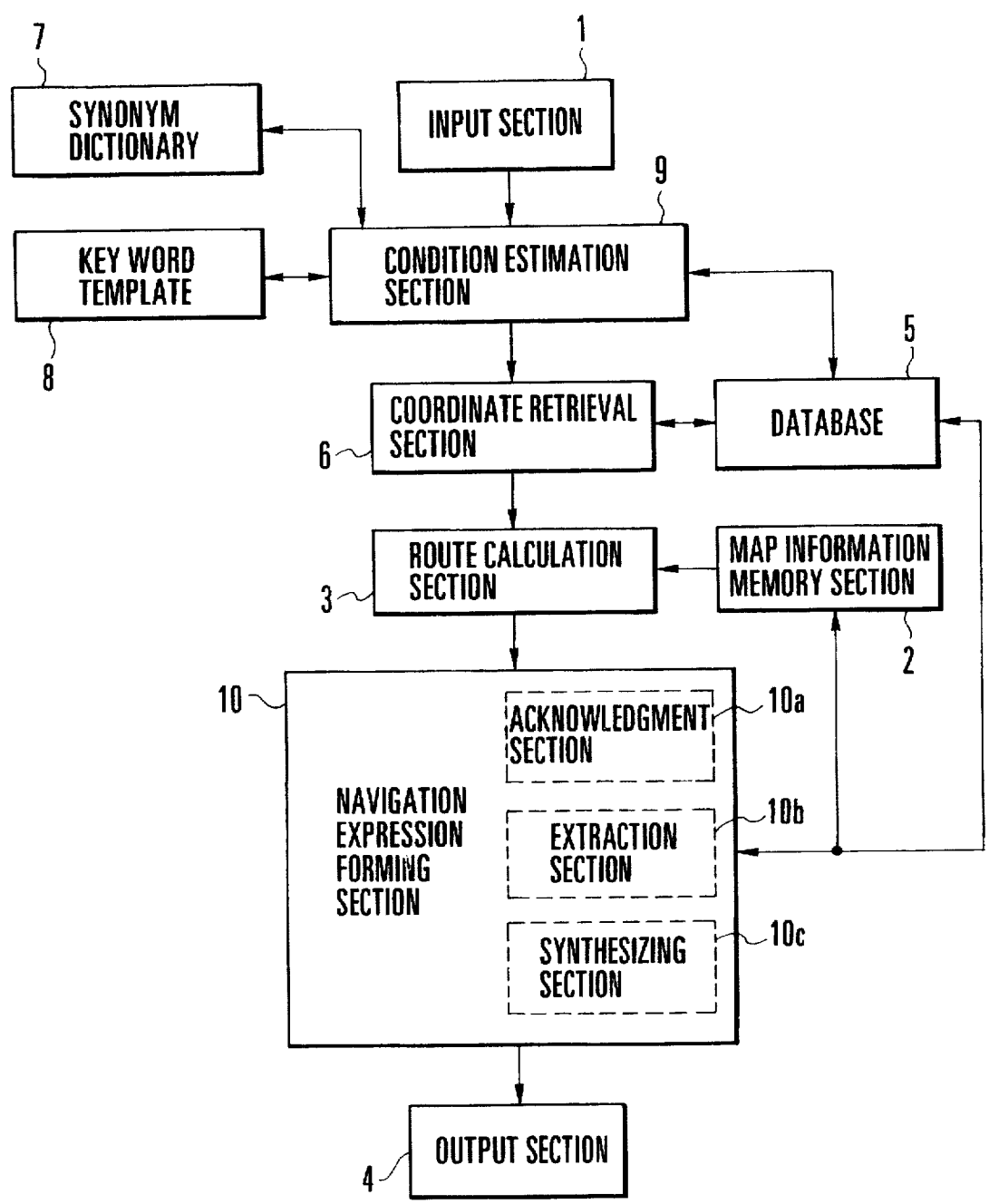
F I G. 8

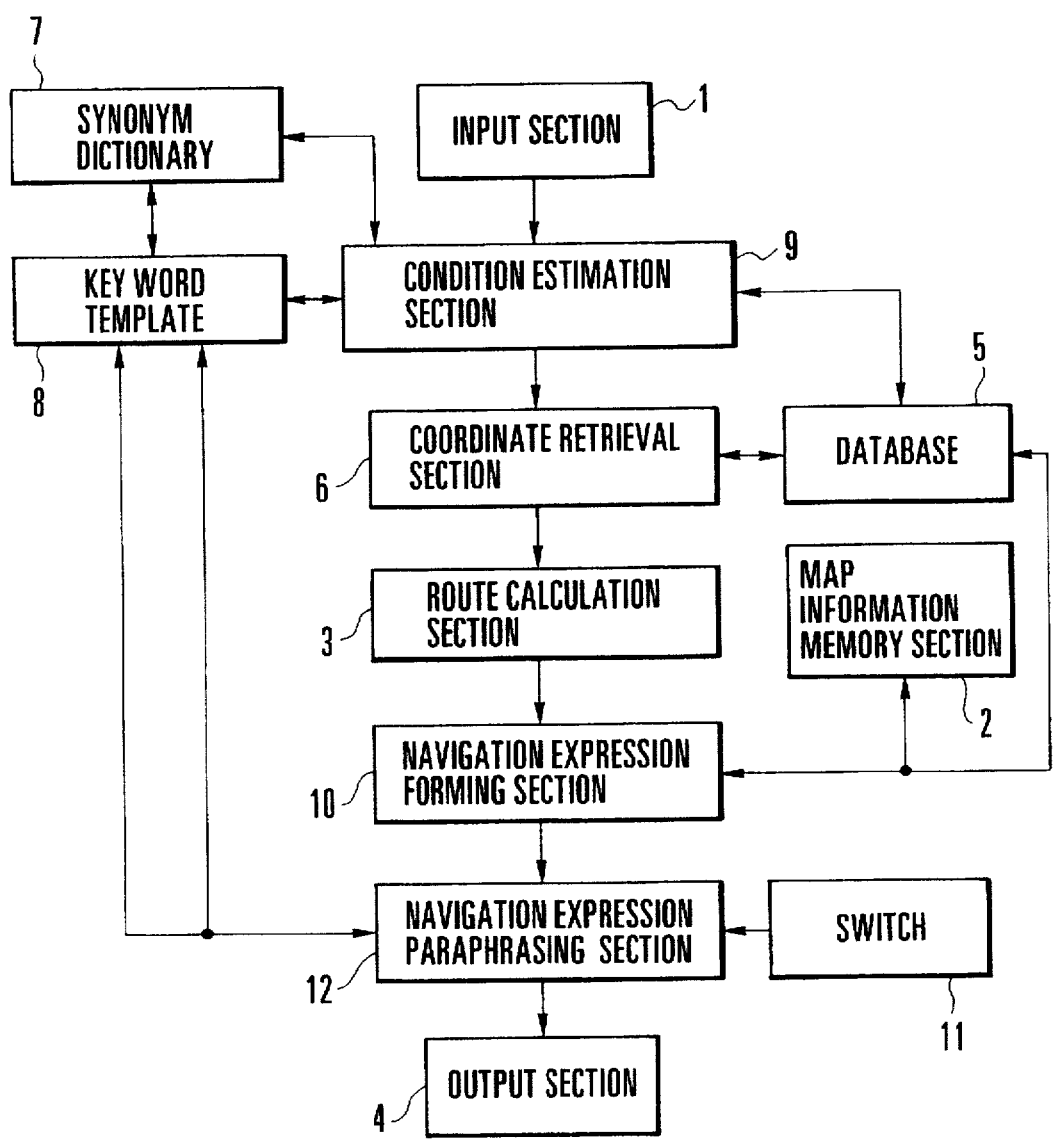
F I G. 9

NAVIGATION APPARATUS USING A POSITION INDEX AND INFORMATION REPRESENTATIVE OF ROADS AND INSTITUTIONS

BACKGROUND OF THE INVENTION

The present invention relates to a moving object navigation apparatus for navigating a user or a moving object to a destination.

In order to manage information associated with the present location of a moving object on a map, moving object navigation apparatuses use the following methods: a method of acquiring the present location of a moving object by receiving a signal transmitted from an intersection and updating a starting point, input by the user, in accordance with the received signal (Japanese Patent Laid-Open No. 59-105113); and a method of acquiring the present location of a moving object by updating a starting point on a map, which is input by the user, in accordance with a traveling distance on a route to a destination set by the user in advance (Japanese Patent Laid-Open No. 03-039106). As a present location acquiring method which allows the user not to acquire the present location of a moving object on a map, a method of automatically acquiring the present location by mounting a communication equipment on the moving object, and repeatedly performing communication between the moving object, a base communication station, and a satellite (Japanese Patent Laid-Open No. 03-282802) is available. A technique of outputting guide information indicating the direction of traveling at a junction or an intersection by speech in natural language is known (Japanese Patent Laid-Open No. 03-039106). A technique of showing a route by speech or by displaying the route on a screen is also known (Japanese Patent Laid-Open No. 63-163210). In addition, a moving object navigation scheme has been realized, in which a moving object is navigated by acquiring the position of the moving object upon transmission/reception of signals between an external unit and the moving object.

As an apparatus using a database inquiry method based on a natural language, an information retrieval apparatus is known (Japanese Patent Laid-Open Nos. 61-118834 and 02-176868). This apparatus associates data of a natural language which is registered in a database with an associated word group, infers a retrieval key from an associated vocabulary contained in an inquiry statement, and infers the type of retrieval request from the key word of the retrieval request, thereby retrieving the corresponding data.

The conventional present location acquiring methods are based on the premise that the user accurately acquires the present location of a moving object on a map and inputs the location as a starting point or a communication equipment is mounted on a moving object and innumerable base communication stations and a satellite for managing position information are installed. In the method of automatically acquiring the present location of moving object by means of communication, present location information in a back alley or the like where alleys or buildings are clustered together must be managed by using finely divided communication frequencies and performing a large amount of calculation. In addition, the present location information must be managed in real time to prevent a delay in driving an automobile. Since the costs of these operations are high at present, this method is not practical. Furthermore, the technique of using a guide statement does not use information other than intersections and the number thereof, and junctions and the number thereof. For example, this technique does not use the outer appearance and position of a building or a billboard as a landmark, the number of traffic lanes, the width of a road, and a slope. For this reason, the user must count intersections or junctions by himself/herself while driving the automobile. In a congested area, it is difficult to provide the accurate number of intersections or junctions. If an instruction is given to the user immediately before he/she needs to make a choice, the user must always be conscious of an instruction. Upon reception of an instruction, the user must quickly follow the instruction without any delay. Such an operation is dangerous and makes the user feel stress every time he/she uses the navigation apparatus. Moreover, there is no method of inputting present location information in general expressions of a natural language.

SUMMARY OF THE INVENTION

It is an object of the present invention to provide a moving object navigation apparatus which can treat points on a map by using road names, institution names, and the features of roads and institutions, all of which can be described using natural language expressions.

In order to achieve the above object, according to the present invention, there is provided a moving object navigation apparatus comprising input means for inputting institution names indicating a present location of a moving object and a destination by using a natural language, memory means for storing a map including information of roads and institutions, a database for storing a relationship between the institution names on the map stored in the memory means and position indexes, retrieval means for retrieving the institution names indicating the present location and the destination, which are input by the input means, from the database, and outputting corresponding position indexes, calculation means for obtaining a shortest route between the position indexes of the present location and the destination, which are output from the retrieval means, by referring to the map stored in the memory means, and output means for outputting route information obtained by the calculation means to a user of the moving object.

BRIEF DESCRIPTION OF THE DRAWINGS

FIG. 1 is a block diagram showing a moving object navigation apparatus according to the first embodiment of the present invention;

FIG. 2 is a view showing data on a map;

FIG. 3 is a view showing data in a database in FIG. 1;

FIG. 6 is a view showing data in a database in FIG. 5;

FIG. 7 is a view showing data on a key word template in FIG. 5;

FIG. 8 is a block diagram showing a moving object navigation apparatus according to the fourth embodiment of the present invention; and FIG. 9 is a block diagram showing a moving object navigation apparatus according to the fifth embodiment of the present invention.

DESCRIPTION OF THE PREFERRED EMBODIMENTS

Figure 4:
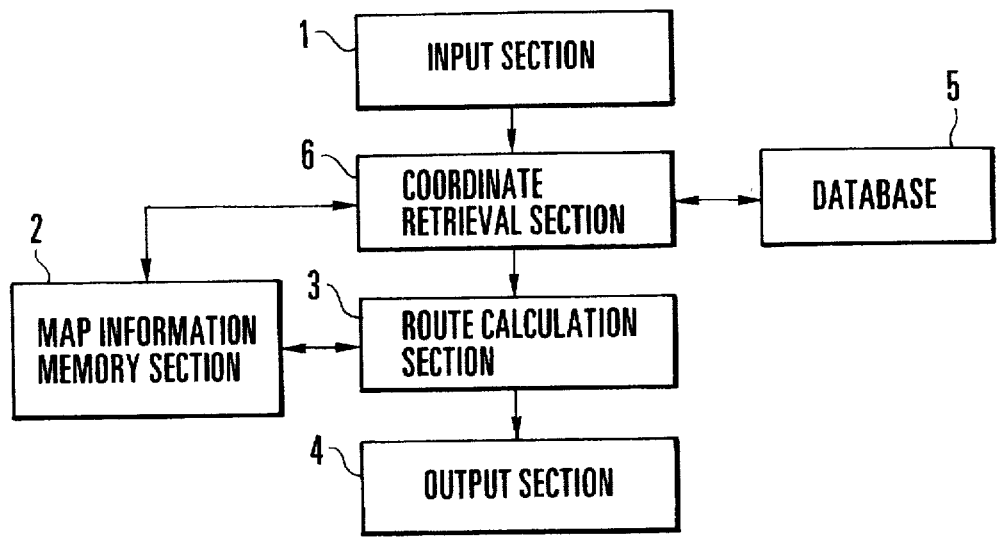
FIG. 4 is a block diagram showing a moving object navigation apparatus according to the second embodiment of the present invention.

FIG. 1 shows the arrangement of a moving object navigation apparatus according to the first embodiment of the present invention. Referring to FIG. 1, the moving object navigation apparatus of the first embodiment includes an input section 1, a map information memory section 2 for storing map information including road and facilities information, a route calculation section 3 for calculating the shortest route between two specific coordinate positions on a map, and an output section 4. This apparatus is characterized by comprising a database 5 associated with facilities on a map, and a coordinate retrieval section 6 for retrieving an institution corresponding to institution information input by the user through the input section 1 from the database 5, and retrieving the coordinates of the institution on the map.

The basic operation of the moving object navigation apparatus of the first embodiment will be described below with reference to FIG. 1. First of all, the user inputs an institution name corresponding to the present location and an institution name corresponding to the destination to the coordinate retrieval section 6 through the input section 1. The coordinate retrieval section 6 then retrieves the position index (coordinates) of the present location on the map and the position index of the destination on the map from the database 5, in which the institution names are associated with the corresponding position indexes on the map, according to the institution name corresponding to the present location and the institution name corresponding to the destination, and transmits the retrieved position indexes to the route calculation section 3. The route calculation section 3 refers to the map to obtain the shortest route from the point indicated by the position index of the present location to the point indicated by the position index of the destination, which indexes have been received from the coordinate retrieval section 6. The route calculation section 3 outputs the shortest route to the output section 4.

FIG. 2 shows an example of the map in the first embodiment. Assume that the moving object navigation apparatus of the first embodiment is used to navigate the user who wants to go to the community center located in the direction indicated by the arrow from the position indicated by the asterisk on the map in FIG. 2. In this case, if the input section 1 is a speech input means, the user utters the name of a gas station N which is nearest to the user, like "present location: gas station N", as an institution name corresponding to the present location, and the institution name corresponding to the destination, like "destination: community center", thereby inputting the institution names to the coordinate retrieval section 6 through the input section 1. The coordinate retrieval section 6 retrieves position indexes indicating the locations of the "gas station N" and the "community center" on the map from the coordinate retrieval section 6, and transmits the position indexes to the route calculation section 3. For example, in the coordinate retrieval section 6 in FIG. 3, the position indexes of the "gas station N" and the "community center" on the map are "1–1a" and "1–1f", respectively. Therefore, "1–1a" and "1–1f" are transmitted to the route calculation section 3. If, for example, the map in FIG. 2 is used, the route "go straight at the first intersection, go straight at the second intersection, and turn to the left in front of the third intersection" is obtained as the shortest route. The output section 4 outputs this route. If, for example, the output section 4 is a means for displaying a map on a screen, the route is written on the map to show the shortest route to the user. Assume that the output section 4 is a speech output module for synthesizing a statement by combining natural language expressions corresponding to the shortest route obtained by the route calculation section 3, i.e., a combination of specific intersections, specific directions, and specific traveling distances, performing speech synthesis of the synthetic statement, and outputting the resultant information. In this case, a navigation statement like "go straight at the two intersections and turn to the left in front of the third intersection" is output upon speech synthesis. As is apparent, the route may be simply identified on the map and displayed on a screen.

As described above, the user can easily input the present location and the destination by simply uttering the name of a notable institution nearest to the present location and an institution name corresponding to the destination without knowing the specific positions of the present location and the destination on the map. The user therefore can be navigated to the destination through the appropriate route between the two points. In addition, since the moving object can be navigated without acquiring the present location by means of communication, communication apparatuses, a satellite, and communication stations need not be fully installed. That is, this embodiment need not wait for the realization of a communication technique as the basis for a navigation apparatus. In addition, according to the embodiment in which a statement for navigation is output by speech, since the user can acquire the shortest route by hearing synthetic speech of the navigation statement, the apparatus can navigate the user to the destination without disturbing user's concentration on driving.

In addition, in the moving object navigation apparatus of the first embodiment, the map information memory section 2 can manage road features, other than the intersections and junctions of roads, e.g., the inclinations and widths of the roads so that the route calculation section 3 can extract road features and route information together. Assume that the apparatus is to navigate the user from the present location in front of the "gas station N" to the "community center", and the "community center" is at the top of a long slope. In this case, the apparatus informs the user of a guide statement including the information of road features like "go straight at the two intersections, go up the slope, and turn to the left in front of the third intersection". The output section 4 may display the route while reflecting the road features. With this operation, the user can easily associate the contents of the guide statement with the road on which he/she moves on the basis of the road features.

FIG. 4 shows the arrangement of a moving object navigation apparatus according to the second embodiment of the present invention. Referring to FIG. 4, the moving object navigation apparatus of the second embodiment is characterized in that the coordinate retrieval section 6 in the first embodiment further refers to road information on the map, and transmits a position index corresponding to the road information to the route calculation section 3. The second embodiment will be described below with reference to FIGS. 2 and 4. Assume that the user at the position indicated by the asterisk on the map inputs an intersection "intersection M" instead of the institution "gas station N" nearest to the user, and requests a route to the "community center". In this case, a coordinate retrieval section 6 refers to road information on the map to retrieve the corresponding present location on the map, and transmits the position index of the present location to a route calculation section 3. In addition, similar to the moving object navigation apparatus in FIG. 1, the position index of the "community center" as the destination is obtained by referring to a database 5, and is transmitted to the route calculation section 3. The route calculation section 3 receives these position indexes and obtains an appropriate route.

Figure 5:
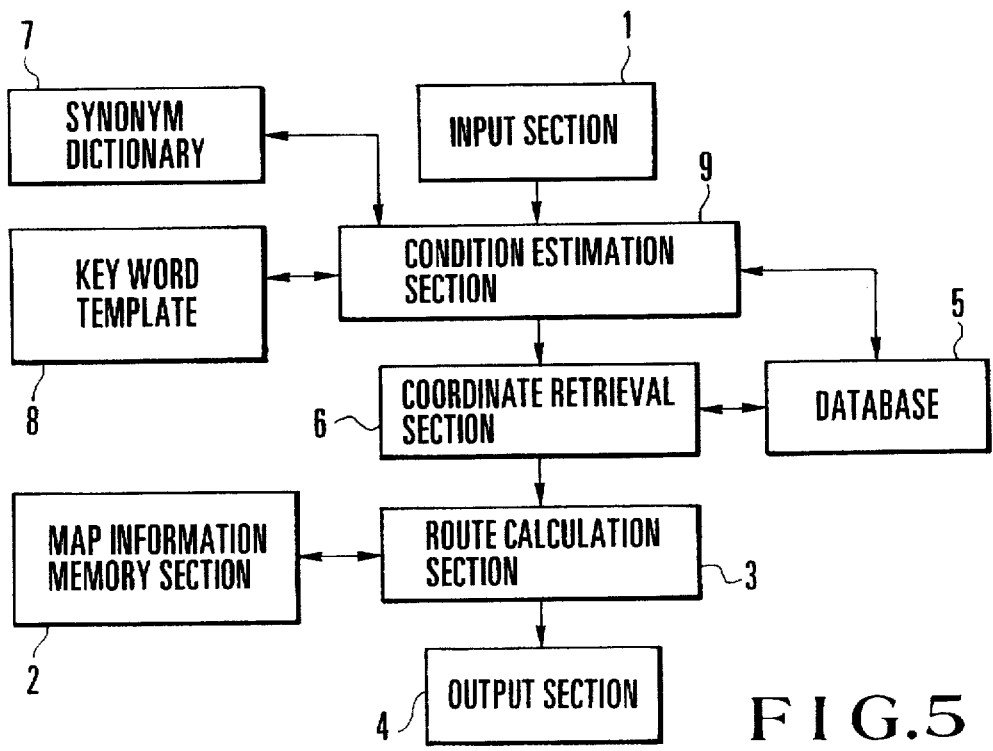
FIG. 5 is a block diagram showing a moving object navigation apparatus according to the third embodiment of the present invention.

FIG. 5 shows the arrangement of a moving object navigation apparatus according to the third embodiment of the present invention. Referring to FIG. 5, the moving object navigation apparatus of the third embodiment is characterized by comprising a synonym dictionary 7, a key word template 8 in which combinations of the data types and the values of data of a database which can be inferred from words are associated with the words, and a condition estimation section 9 which receives an input statement from the input section 1, converts words indicating the destination and the present location in the input statement into key words suitable for data held in the database 5 by referring to the key word template 8, and transmits the key words to the coordinate retrieval section 6, in addition to the components of the embodiment shown in FIG. 1. Furthermore, the apparatus is characterized in that the database 5 stores the outer appearance features of institutions, the sizes of buildings, and the like as well as institution names and position indexes on a map.

FIG. 6 shows an example of the database 5 in FIG. 5. FIG. 7 shows an example of the key word template 8 in FIG. 5. Referring to FIG. 7, the key word template 8 associates the expression "white" with the data type "outer appearance feature" and its value "white", and also associates the expression "white" with the data type "construction year" and its value "1992 or later" as information which can be generally associated only by inference. In addition, the key word template 8 associates the expression "short" with the number of floors "three or less".

The third embodiment will be described below with reference to FIGS. 2, 5, 6, and 7. Assume that the user inputs "short white building" indicating "company A" on the map through the input section 1. In this case, the condition estimation section 9 receives the input statement from the input section 1 and refers to the synonyms in the synonym dictionary 7 and the key word template 8 to convert the expression "white" in the input statement into a condition suitable for data held in the database 5. In the case shown in FIG. 7, the condition estimation section 9 converts the expression "white" into the value "white" of the data type "outer appearance feature" and the value "1992 or later" of the data type "construction year" as conditions, and also converts the expression "short" into the value "3 or less" of the data type "the number of floors" as a condition. Subsequently, the condition estimation section 9 transmits these conditions to the coordinate retrieval section 6. The coordinate retrieval section 6 receives the conditions and refers to the database 5 to transmit the position index of the company A to the route calculation section 3.

In this case, upon reception of "short ivory building" indicating "company A" on the map from the input section 1, the condition estimation section 9 refers to the synonym dictionary 7 to extract "white" as a synonym of "ivory", and refers to the key word template 8 by using the extracted word "white" as a key word.

As described above, the moving object navigation apparatus of the third embodiment receives expressions indicating features such as the outer appearance and size of an institution instead of an accurate institution name. Even if, therefore, the user does not know the institution name, the apparatus can navigate the user in the same manner as the case wherein the accurate institution name is input. In this case, even if the user does not know the expressions of data types and values written on the database 5, the apparatus can extract corresponding conditions and navigate the user in the same manner as the case wherein the accurate expressions of data types and values are input. According to another embodiment, when the user inputs a road feature as the present location, e.g., expresses "intersection M" on the map as "a large intersection", the input expression may be acknowledged as "intersection M", and "intersection M" may be acknowledged as the present location.

FIG. 8 show the arrangement of a moving object navigation apparatus according to the fourth embodiment of the present invention. Referring to FIG. 8, the moving object navigation apparatus of the fourth embodiment is characterized by including a navigation expression forming section 10 in addition to the components of the third embodiment shown in FIG. 5. The navigation expression forming section 10 comprises an acknowledgement section 10a which receives a route calculated by the route calculation section 3, and refers to the map to acknowledge institutions and roads as landmarks on the route where large changes occur in the process of movement, e.g., changes in traveling direction, changes in junction and road, and arrival at the destination, an extraction section 10b for extracting the information of the institutions and the roads as landmarks acknowledged by the acknowledgement section 10a by referring to position information, positional relationship information, road information on the map, and the attributes of institutions in the database 5, and a synthesizing section 10c for synthesizing expressions obtained by combining the attributes as the landmarks and the names, and transmitting the expressions to the output section 4. The fourth embodiment will be described below with reference to FIGS. 2, 6, and 8. The navigation expression forming section 10 receives a route calculated by the route calculation section 3, and refers to the map and the database 5 to retrieve a landmark on the route where a large change occurs in the process of movement. Assume that "community center" is retrieved. In this case, the navigation expression forming section 10 extracts "brown stairs", "six-story building", and the like as attributes of the community center on the database 5 to form the expression "the six-story community center with brown stairs" and express the intersection near the community center as "the intersection near the six-story community center with brown stairs". The navigation expression forming section 10 transmits the resultant information to the output section 4. Upon reception of the information, the output section 4 displays the information on a screen or outputs it by speech. The user therefore can go along the route according to the appropriate landmark.

FIG. 9 shows the arrangement of a moving object navigation apparatus according to the fifth embodiment of the present invention. Referring to FIG. 9, the moving object navigation apparatus of the fifth embodiment is characterized by comprising a switch 11 and a navigation expression converting section 12 in addition to the components of the fourth embodiment in FIG. 8. The switch 11 receives an instruction from the user. The navigation expression paraphrasing section 12 is started through the switch 11 to receive a synthetic statement from the navigation expression forming section 10, paraphrase the expression of a landmark in the synthetic statement by referring to the synonym dictionary 7 and the key word template 8, add the resultant expression to the received synthetic statement, and transmit the resultant statement to the output section 4. The fifth embodiment will be described below with reference to FIG. 9.

When an instruction from the user is received by the switch 11, the navigation expression paraphrasing section 12 is started. The navigation expression paraphrasing section 12 receives a synthetic statement from the navigation expression forming section 10, and synthesizes a statement obtained by paraphrasing the expression of a landmark in the synthetic statement by referring to the synonym dictionary 7 and the key word template 8. For example, the navigation expression paraphrasing section 12 paraphrases the data "1970" as "construction year" as an attribute of "community center" registered in the database 5 into the expression "old", adds it to the expression received from the navigation expression forming section 10, and transmits the resultant data to the output section 4. With this operation, even if it is difficult for the user to understand the expression of a landmark on the database 5 or the map, the amount of information which can be used to acknowledge the landmark can be increased if the user wishes.

As has been described above, the moving object navigation apparatus of the present invention includes the database in which the names and addresses of institutions on a map are registered. The apparatus receives institution names input, as the present location and the destination, by the user, and retrieves coordinates on the map which correspond to the inputs from the database, thereby providing an appropriate route. With this operation, even if the user does not know the coordinates of the present location and the destination on the map, the coordinates of the present location and the destination can be input by only inputting the names and features of the nearby institutions in natural language expressions. Consequently, the moving object can be navigated without acquiring the present location by means of communication.

In addition, the map manages road features other than intersections and junctions, and road features can be extracted together with route information. Furthermore, road information of the map is referred to acknowledge a position index corresponding to the road information, thereby receiving the road information as a key for input of the present location.

The database is used to hold the attributes of institutions together with the names and addresses of the institutions. The apparatus includes the key word template in which combinations of data types and data values in the database which can be inferred from the synonym dictionary and natural language expressions are associated with the natural language expressions. Key words in an input statement which indicate objects to be retrieved are converted into conditions suitable for data in the database by referring to the key word template. With this operation, an appropriate route can be provided even with respect to a navigation request statement in a natural language which uses expressions which cannot be recognized as words associated with the conditions without inference.

The information of an institution or a road as a landmark where a large change occurs in the process of movement on the provided route is extracted by referring to the map and the database, and a navigation expression indicating the landmark is provided for the user, thereby allowing the user to go along the route according to the appropriate landmark.

The apparatus includes the switch which receives an instruction from the user. When the switch is turned on, a paraphrased expression of a navigation expression indicating a landmark is synthesized by referring to the synonym dictionary and the key word template. This expression is provided for the user together with the original navigation expression. With this operation, if it is difficult for the user to understand an initially provided navigation expression, he/she can obtain a paraphrased expression for acknowledging the landmark.

What is claimed is:

1. A moving object navigation apparatus comprising:

input means for inputting institution names indicating a present location of a moving object and a destination using a natural language;

memory means for storing a map including information representative of roads and institutions;

a database for storing relationships between institution names on the map and position indexes;

retrieval means for retrieving position indexes corresponding to institution names indicating the present location and the destination;

calculation means for obtaining a shortest route between the position indexes of the present location and the destination by referring to the map stored in said memory means; and output means for outputting route information obtained by said calculation means to a user of the moving object, wherein said memory means stores information representative of intersections and junctions as the information representative of roads and institutions, wherein said output means outputs the route information obtained by said calculation means by using the information representative of intersections and junctions, wherein said memory means further stores information associated with road features as the information representative of roads and institutions, the information associated with road features including information representative of inclinations and widths of roads, wherein said calculation means extracts the information associated with roads from said memory means in accordance with route information obtained by said calculation means, and wherein said output means outputs information associated with the road features together with route information.

2. An apparatus according to claim 1, wherein when road information representing at least one of the present location and the destination is input from said input means, said retrieval means outputs a position index corresponding to the input road information to said calculation means by referring to the road information on the map stored in said memory means, and said calculation means obtains a shortest route between the present location and the destination by using the position index from said retrieval means.

3. An apparatus according to claim 1, wherein said input means is speech input means for inputting a destination and a present location by speech.

4. An apparatus according to claim 1, wherein said output means is speech synthesis means for outputting a navigation expression of a route calculated by said calculation means upon speech synthesis.

5. A moving object navigation apparatus comprising:

input means for inputting institution names indicating a present location of a moving object and a destination using a natural language;

memory means for storing a map including information representative of roads and institutions;

a database for storing a relationship between the institution names on the map and position indexes;

retrieval means for retrieving position indexes corresponding to institution names indicating the present location and the destination;

calculation means for obtaining a shortest route between the position indexes of the present location and the destination by referring to the map stored in said memory means;

output means for outputting route information obtained by said calculation means to a user of the moving object;

a key word template in which combinations of data types and data values in said database which can be inferred from natural language expressions are associated with the natural language expressions; and condition estimation means for converting a key word in a natural language, which is in an input statement received from said input means and indicates an object to be retrieved, into a data type and a data value used in said database by referring to said key word template, and outputting the data type and the data value to said retrieval means, wherein attributes of an institution including a data type and a data value are registered in said database, together with a name and position index of the institution, and wherein an outer appearance feature of an institution and a size of a building are registered, as attributes of the institution, in said database.

6. A moving object navigation apparatus comprising:

input means for inputting institution names indicating a present location of a moving object and a destination using a natural language;

memory means for storing a map including information representative of roads and institutions;

a database for storing a relationship between the institution names on the map and position indexes;

retrieval means for retrieving position indexes corresponding to institution names indicating the present location and the destination;

calculation means for obtaining a shortest route between the position indexes of the present location and the destination, which are output from said retrieval means, by referring to the map stored in said memory means;

output means for outputting route information obtained by said calculation means to a user of the moving object;

a key word template in which combinations of data types and data values in said database which can be inferred from natural language expressions are associated with the natural language expressions;

condition estimation means for converting a key word in a natural language, which is in an input statement received from said input means and indicates an object to be retrieved, into a data type and a data value used in said database by referring to said key word template, and outputting the data type and the data value to said retrieval means; and a synonym dictionary in which synonyms of key words are registered, wherein attributes of an institution including a data type and a data value are registered in said database, together with a name and position index of the institution, and wherein said condition estimation means extracts a key word from a synonym in the input statement received from said input means by referring to said synonym dictionary.

7. A moving object navigation apparatus comprising:

input means for inputting institution names indicating a present location of a moving object and a destination using a natural language;

memory means for storing a map including information of roads and institutions;

a database for storing a relationship between the institution names on the map and position indexes;

retrieval means for retrieving position indexes corresponding to the institution names indicating the present location and the destination;

calculation means for obtaining a shortest route between the position indexes of the present location and the destination, which are output from said retrieval means, by referring to the map stored in said memory means;

output means for outputting route information obtained by said calculation means to a user of the moving object;

navigation expression forming means including acknowledgement means for acknowledging an institution and a road as landmarks for places where large changes occur in the process of movement of the moving object on the route obtained by said calculation means by referring to the map stored in said memory means, extraction means for extracting information, associated with the institution and the road as the landmarks acknowledged by said acknowledgement means, by referring to position information on the map, positional relationship information, and road information, which are stored in said memory means, and attributes of the institutions registered in said database, and synthesizing means for synthesizing a navigation expression by combining an attribute and name of an institution extracted by said extraction means and outputting the expression to said output means, and wherein an attribute of an institution is registered in said database together with a name and position index of the institution; and a synonym dictionary in which synonyms are registered, a key word template in which combinations of data types and data values in said database which can be inferred from natural language expressions are associated with the natural language expressions, switch means for designating a paraphrasing operation, and navigation expression paraphrasing means which is started by said switch means to paraphrase a navigation expression from said navigation expression forming means by referring to said synonym dictionary and said key word template, adding the paraphrased expression to the navigation expression, and outputting the resultant expression.

* * * * *